Figure 1:
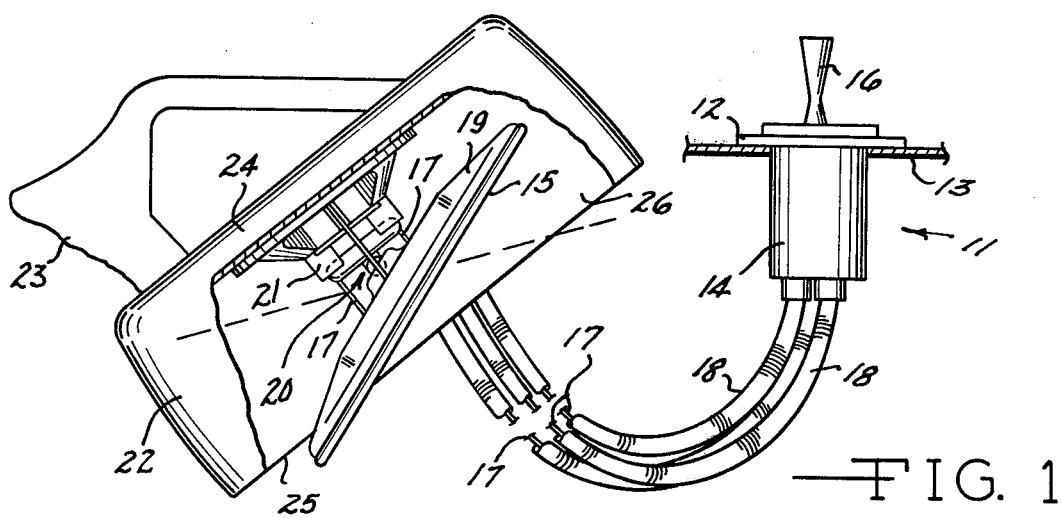

//  # United States Patent [19]

Mills

[11] 3,918,319
[45] Nov. 11, 1975

[54] CROSS ARM MIRROR MOUNT
[75] Inventor: John E. Mills, Strongesville, Ohio
[73] Assignee: Harman International Industries, Inc., Detroit, Mich.
[22] Filed: Oct. 3, 1973
[21] Appl. No.: 403,192

[52] U.S. Cl. .................... 74/491; 74/501 M; 403/58
[51] Int. Cl.² ............................................. G05G 1/00
[58] Field of Search ............ 403/58; 74/491, 501 M

[56] References Cited
UNITED STATES PATENTS

| | | |
|---|---|---|
| 660,049 | 10/1900 | Cook .................................... 403/58 |
| 1,380,910 | 6/1921 | Hubbard ............................... 403/58 |
| 2,570,735 | 10/1951 | Weise .................................. 403/58 |
| 2,617,671 | 11/1952 | Barrango ............................. 403/58 |
| 3,286,545 | 11/1966 | Malochowski ................... 74/501 M |
| 3,550,468 | 12/1970 | Pringle et al. .................... 74/501 M |

Primary Examiner—Samuel Scott
Assistant Examiner—Wesley S. Ratliff, Jr.
Attorney, Agent, or Firm—Miller, Morriss, Pappas & McLeod

[57]     ABSTRACT

A cross arm mirror mount for open faced mounting of remote control rearview mirrors and the like wherein the mirror is urged onto journals provided in a cross arm and a mirror support pedestal. An elongate bearing is provided between the mirror back and an elongate rod or bar-like element. Another elongate bearing at right angles to the first mentioned elongate bearing and attached thereto form the other arm of the cross arm structure which is supported in a mounting pedestal so that movement on one axis is achieved at the mirror and movement about a transverse axis is accomplished at the pedestal to result in permitted movement of the mirror in the nature of limited universal motion while stabilizing the mirror against rotation in the plane of the mirror glass.

7 Claims, 3 Drawing Figures

U.S. Patent Nov. 11, 1975 3,918,319

CROSS ARM MIRROR MOUNT

The present invention is directed to a unique cross arm mirror mount or support for remote control rearview mirrors and the like in which the cross arm provides transverse integrated elongate pivot axes which rest in open journal slots or troughs in the mirror and the pedestal thereby providing a simple and functional support which stabilizes the mirror against rotation in the plane of the glass while allowing limited universal manipulation of the glass. Accordingly, the cross arm is compressibly sandwiched between a slot or trough in the mirror back and a slot or trough in the pedestal, the cylindrical rods of the cross arm nesting in, respectively, one in the mirror trough and one in the pedestal trough at right angles to each other. Wear compensating compression is achieved as by tensioning control cables which urge the mirror against the cross arm element. This construction provides smooth performance of limited universal movement of the mirror about the two axes or combinations of both axes while the elongate journals prevent rotation of the structure in the plane of the mirror.

THE PRIOR ART

Modern remote control rearview mirrors commenced with the U.S. Letters Patent to Jacobson, U.S. Pat. No. 2,931,245, in which stabilization of the mirror was achieved by friction introduced by the tension from springs at either or both of the control and controlled end of the structure and by the impingement against the pivots at the control and controlled end. This served well provided that the symmetry of mounting a round mirror was retained. As styling and optical desirability shifted the mirrors to oblong, rectangular, and rectilinear, the problem of controlling tendencies of the mirror surface to rotate in the plane of the glass became apparent and the simple solution in mere friction disappeared. The problem was also complicated by asymmetric pivot mounting so that an eccentric mass was provided. Complex solutions began to appear as in U.S. Pat. No. 3,655,273 to Pringle; experimentation with fixed pivots as in U.S. Pat. No. 3,283,607 to Van Noord; and the fixed span arc gear of the U.S. Pat. Nos. 3,251,238 and 2,614,437 to Fuqua and Meggitt, respectively. In addition, a device made its appearance commercially which comprised a pair of spaced-apart pivots and a crescent or arc segment opposite the pivots in a common structure. Dimples in the mirror back engaged the spaced-apart pivots and a nesting crescent groove in the mirror pedestal supports the crescent segment to achieve a mean universal motion while stabilizing the mirror against rotation in the plane of the mirror. The present invention differs from the prior art but seeks to achieve the object of stabilizing the mirror in a new and inventive manner and by use of a wholly new structure.

Accordingly, the principal object of the present invention is to provide a new structure for holding a remote control mirror or the like against a tendency to rotate in the plane of the mirror while allowing limited universal control movement of the mirror.

Another object is to show how a cross arm mount can achieve stabilization and smooth pivotal support of the mirror without the introduction of unusually high friction force.

Another object is to teach an economical open pivot construction having high utility in remote control structures where the bearing is under compression and where the bearing is wear compensating.

Still another object is to provide a cross arm pivot structure in which the two axes of the cross arm need not intersect while providing a control over rotation of the mirror glass in the plane of the glass.

Other objects including economy, integration of parts, and simplicity of mounting will become apparent as the description proceeds.

GENERAL DESCRIPTION

In general, the invention is a mirror mounting for open faced compression type remote control rearview mirrors and like structures wherein the mirror back is provided with an elongate slot or trough in the form of the segment of a cylinder. Then a cross arm structure is provided in the form of a pair of crossed cylindrical bars. The bars are secured together as by welding, brazing, or casting at their intersection so that there is integrity as between the bars. One of the bars of the cross arm nests in the trough or elongate slot provided in the mirror back. The other of the bars is similarly received in an elongate slot or trough provided in a support pedestal. Such a journalling in a trough of substantial length across the mirror back tends to wholly eliminate lost motion tendencies likely to cause rotation of the mirror in the plane of the glass. Likewise, the trough-groove journalling in the pedestal results in good stabilization and location of the cross arm element intermediate the open troughs in a compression relationship which results in excellent wear compensation on smooth operating pivots and including limited universal capabilities for the mirror movement. This is ideal for remote control rearview mirrors which are stressed as by cables or control wires in tension between the actuator and the remote mirror. The tension in the cables or wires is normally accomplished by spring means tensioning the cables and hence drawing the mirror back firmly against its support or mount. Manipulation of the same cables achieves universal adjustment of the mirror on the journals described. Such a system of mounting as described herein delimits former requirements of reasonable symmetry in mirror mounting.

IN THE DRAWINGS

FIG. 1 is a partially cut away top plan view of a mirror in accord with the present invention and indicating the remote actuator element operably connected to the mirror back by the bowed wire of sheathed cable elements.

Figure 2:
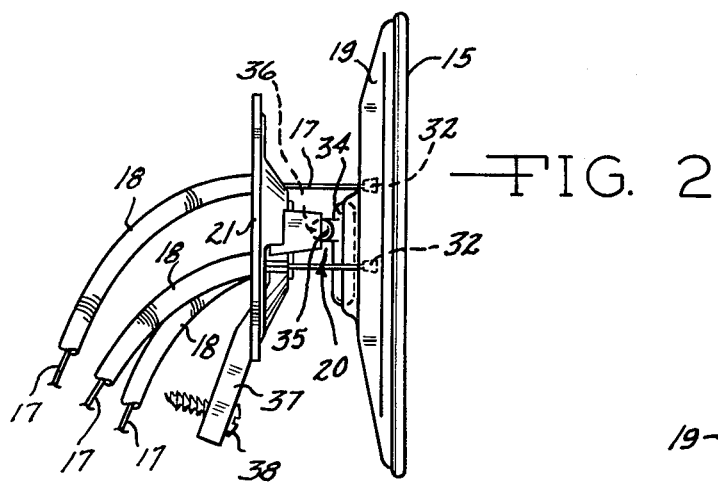

FIG. 2 is a side elevation view of the mirror in accord with the present invention and indicating one arm of the cross arm pivot journalled in the mirror back or case and the other arm journalled in the horizontally disposed slot in the pedestal support element and with tension in the wires or cables compressing the mirror back and pedestal slots into control engagement with the respective arms of the cross arm element.

Figure 3:
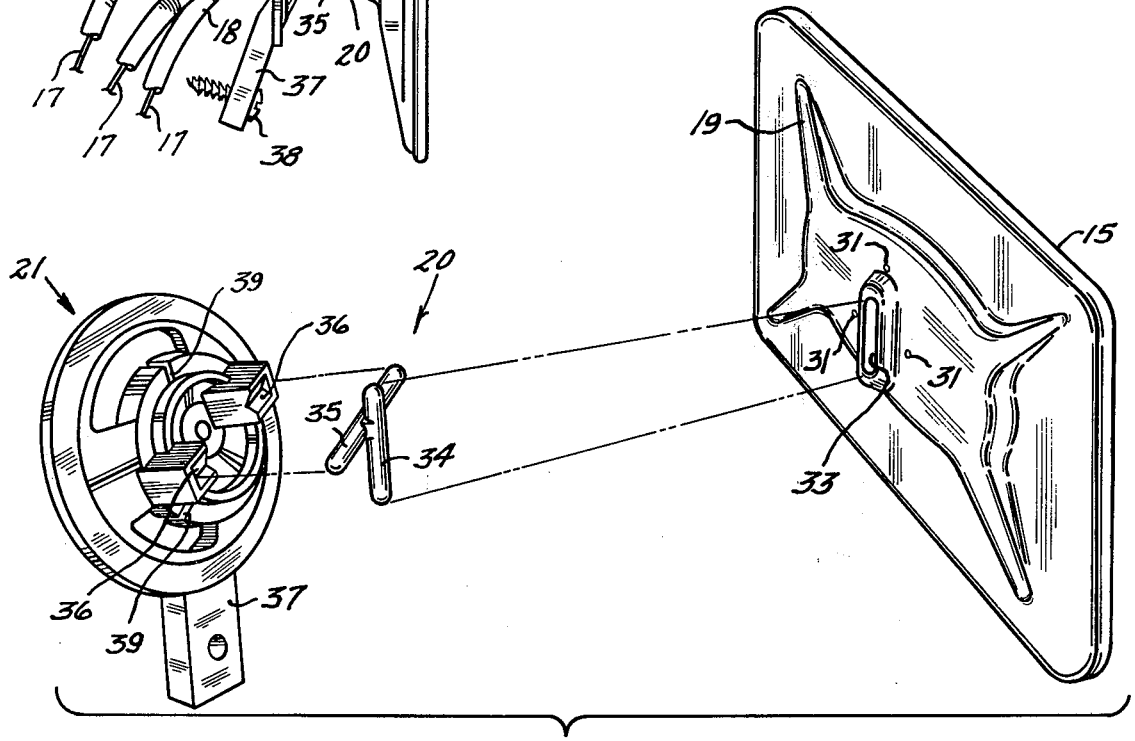

FIG. 3 is an exploded perspective view of the mirror back, the cross arm element and the support pedestal and indicating the simplicity of assembly with the cross arm element providing rotation of the mirror on two axes provided by the cross arm and in restriction of rotational tendencies in the mirror.

SPECIFIC DESCRIPTION

Referring to the drawings and with first particularity to the FIG. 1 thereof, the mounting means for limimted universal movement of a remote control rearview mirror or the like is illustrated in a three wire or cable tension system. The actuator 11 is illustrated as usually secured to an escutcheon plate 12 and extending through a door or dash panel 13 which is a part of a vehicle not illustrated. The body 14 of the actuator 11 houses a mechanism for limited universal manipulation of the remote mirror 15. The actuator control knob 16, when manipulated, causes movement of tensioned cables 17 in the sheaths 18 (together comprising Bowden mechanisms) so that as the knob 16 is moved, corresponding motion occurs in the mirror 15 by reason of its terminal connection to the cables or wires 17 at the mirror back 19. As illustrated, a three wire mechanism is shown. Tension in the wires 17 draws the mirror back 19 into engagement with a cross arm element 20 which, as will be seen, is interposed between the mirror back 19 and the mirror support pedestal 21. The tension in the cables 17 is achieved by use of a compression spring (usually in the body 14 of actuator 11) urging the pivot of the actuator knob 16 outwardly while retaining the sheaths 18 in socketed relation between the mirror support pedestal 21 and the actuator 11. Typical actuators 11 are seen in the U.S. Pat. No. 2,931,245 and others are well known in the art of remote control rearview mirrors. While a three wire control is illustrated and is currently the most common type of control, three, two and four wire systems are known and, if tensioned, are useable in the present invention. Even one wire systems where the sheath controls one axis and the core wire controls another fall within the use range of the presently described mirror mount.

In captive operating systems where the axes are structurally fixed, the present invention also will be seen to have utility.

The mirror shroud or housing 22 is externally secured to a body panel 23 of an automobile and the closed side 24 usually faces forwardly (in the direction of forward travel) while the open side 25 contains the mirror 15, the cross arm element 20 and the pedestal 21. The pedestal 21 is secured to the housing 22 in the cavity 26 thereof. The shroud or housing 22 may be styled variously to accommodate particular locations and vehicular styles as found in different automobile makes and models. The pedestal 21 may be made integral with the housing 22 but the preferred embodiment is to removably fasten the pedestal 21 in the cavity 26 of the housing 22.

In FIG. 2, the mirror mounting details are better appreciated. The mirror 15 is supported by a back 19 in the form of a shell peripherally supporting the mirror 15 and including a rear boss portion 30 and boss portion 30 is pierced selectively at the openings 31 so that the cables or wires 17 can be passed therethrough and secured against withdrawal by the terminal end ferrules 32. The ferrules 32 fastened to the ends of cables 17 (when the cables 17 are tensioned) draw the back 19 and mirror 15 into engagement with the cross arm element 20 and a trough 33 formed in the boss 30 provides a rocker nest support for the arm 34 of the cross arm element 20. The trough 33 provides a retention against axial or rotational displacement while allowing limited pivoting on the axis formed by the arm 34. The arm 35, at right angles to the arm 34 and integral therewith is supported in a similar slot or trough 36 shown in bifurcated form in the pedestal 21. The arms 34 and 35 are cylindrical and each provides a separate journalling control axis providing a composite universal or pivoted movement by the mirror 15. The troughs 33 and 36 in mirror back 19 and pedestal 21, respectively, mate with the cylindrical exterior of the arms 34 and 35 for support by less than 180 degrees or contact whereby rotation on each of the axes is allowed. Accordingly, cylindrical journalling is provided and in each case restrained against axial movement by the ends of the troughs 33 and 36 and in each case nested against shifting or repositioning of the axes in the arms 34 and 35. The integrity of the arms 34 and 35 assures rigidity in the plane of the mirror 15. As will be appreciated, the cross arm element 20 stabilizes the mirror 15 and back 19 against rotation in the plane of the mirror 15 thereby providing a much improved and simple stabilizing support. The cross arms 34 and 35, as shown, are on separate axes spaced slightly apart from each other. Hence, in this structure the axes of the arms are slightly offset by an amount approximating the diameter of the rod stock forming cross arm element 20.

The support pedestal 21 includes a mounting arm 37 through which a fastener 38 is passed. The sheaths 18 are buttressed against the backside of the pedestal 21 and are preferably socketed therein while the cables 17 pass through slots 39 in target registry with the openings 31.

The compression relationship of the cross arm element 20 between the mirror back 19 and pedestal 21 is best appreciated in the exploded view of FIG. 3 and nesting of the arms 34 and 35 in the respective troughs 36 and 33 can be most readily appreciated. This provides stabilization while providing limited rotation on each axis so as to provide universal movement in the mirror 15 as called for by remote manipulation of the actuator knob 16.

The bifurcated slot 37 36 to provide clearance for the relative movement of the arm 34 as it rocks on the axis of arm 35. Reversal of parts is contemplated where dictated by the necessity of a particular design. The mirror back 19 may be secured to the mirror 15 as by adhesives or the like and the pedestal 21 may have various configurations and may be integral with the housing 24. It is also contemplated that under certain circumstances the cross arms 34 and 35 may be captured as by staking or upset on assembly rather than resting in open troughs 33 and 36 as shown.

Having thus described my invention and in particular one operating embodiment thereof, other modifications, changes and improvements will be readily appreciated by those skilled in the art and such modifications, changes and improvements are intended to be included herein, limited only by the scope of my hereinafter appended claims.

I claim:

1. An open faced compression mounting for remotely controlled rearview mirrors and the like comprising:
    an elongate trough provided in a mirror back;
    a cross member comprising a pair of cylindrical crossed elements joined integrally at their cross point contact with each other;
    an elongate trough in a support post, said trough at right angles to said elongate trough of said mirror back; and compression transmitting means urging said mirror back and said support post to close on said cross member engaging said troughs thereof.

2. An open faced compression mounting for remotely controlled rearview mirrors and the like comprising:
- a mirror case having an elongate open slot therein;
- a cylindrical bar resting in said slot of said case;
- a second cylindrical bar intergrally secured to said first mentioned bar and transverse thereof, said bars secured together at their point of intersection;
- a support pedestal having an elongate open slot therein into which slot said second of said bars rests; and
- tension transmitting means acting on said mirror case and compressing said mirror case against said cylindrical bars and thence against said pedestal.

3. An open faced compression pivot mounting for remotely controlled rearview mirrors and the like comprising:
- a cross arm member, one arm thereof providing a first cylindrical journalling portion and the other arm thereof providing a separate but integrated journal in an axis at right angles to said first cylindrical journalling;
- a mirror back having a trough therein which nestably receives said first journalling portion of said cross arm member;
- a pedestal element having a trough therein which nestably receives said second journalling portion of said cross arm member;
- transmitting means compressing said cross arm member between said pedestal and said mirror back; and
- means providing selected limited universal movement of mirror back on said cross arm member at said first and second journalling portions.

4. An open faced compression mounting for remotely controlled rearview mirros or the like comprising a mirror back having an elongate trough formed therein, a support pedestal having a pair of spaced apart protuberances, each protuberance having a trough portion therein co-axial with the trough portion of the other protuberances and at right angles to the elgonate trough of said mirror back, and a separate, unitary integral cross bar member, said member having a first portion with an elongate circular cylindrical surface rotatably mateable with said elongate trough in the mirror back, said member having a second portion integral with said first portion and including a pair of spaced apart co-axial circular cylindrical surfaces respectively rotatably mateable with the trough portion of a specific one of said protuberances, the axis of the circular cylindrical surface of said first portion being at right angles to the axis of said pair of spaced apart cylindrical surfaces, and compression transmitting means urging said mirror back and said support pedestal to close on said cross bar member.

5. An open faced compression mounting for remotely controlled rearview mirrors or the like as set forth in claim 4 wherein stop means cooperating between said pedestal and said cross bar member are provided preventing axial displacement of said cross bar member.

6. An open faced compression mounting for remotely controlled rearview mirrors or the like as set forth in claim 4 wherein ends of one of said troughs confine one of said elongate cylindrical surfaces against axial displacement.

7. In the structure of claim 4 wherein said first portion of said cross bar member is tiltable between said two protuberances.

* * * * *

UNITED STATES PATENT OFFICE
CERTIFICATE OF CORRECTION

PATENT NO. : 3,918,319
DATED : 1975 November 11
INVENTOR(S) : John E. Mills

It is certified that error appears in the above-identified patent and that said Letters Patent are hereby corrected as shown below:

Column 3, line 4, "limimted" should read --- limited ---.

Column 4, line 40, delete "37" and insert --- is --- after "36".

Column 5 (Claim 3), line 31, insert --- tension --- before "transmitting".

Column 6 (Claim 4), line 2, "mirros" should read --- mirrors ---.

Signed and Sealed this ninth Day of March 1976

[SEAL]

Attest:

RUTH C. MASON
Attesting Officer

C. MARSHALL DANN
Commissioner of Patents and Trademarks